US007303295B1

(12) United States Patent
Press

(10) Patent No.: US 7,303,295 B1
(45) Date of Patent: Dec. 4, 2007

(54) REAR VIEW MIRROR ASSEMBLY AND SYSTEM

(76) Inventor: Irving D. Press, 32 Ferris Dr., West Orange, NJ (US) 07052

( * ) Notice: Subject to any disclaimer, the term of this patent is extended or adjusted under 35 U.S.C. 154(b) by 0 days.

(21) Appl. No.: 11/233,763

(22) Filed: Sep. 23, 2005

Related U.S. Application Data

(63) Continuation-in-part of application No. 11/159,001, filed on Jun. 22, 2005.

(60) Provisional application No. 60/582,530, filed on Jun. 24, 2004.

(51) Int. Cl.
  *G02B 5/08* (2006.01)
  *G02B 7/182* (2006.01)
  *B60R 1/06* (2006.01)
(52) U.S. Cl. .................. 359/841; 359/872; 359/875; 359/877; 74/502.1
(58) Field of Classification Search ............... 359/841, 359/843, 872, 877, 900, 875; 74/502.1
See application file for complete search history.

(56) References Cited

U.S. PATENT DOCUMENTS

| | | | |
|---|---|---|---|
| 2,558,328 A | 6/1951 | Winslow | 248/205 |
| 3,612,667 A | 10/1971 | Orr | 350/289 |
| 3,625,597 A * | 12/1971 | Jones | 74/502.1 |
| 3,633,300 A | 1/1972 | Poizner | 40/152 |
| 3,659,477 A | 5/1972 | Wehner | 74/501 |
| 4,078,859 A | 3/1978 | Sharett | 350/279 |
| 4,159,866 A | 7/1979 | Wunsch et al. | 350/289 |
| 4,171,875 A * | 10/1979 | Taylor et al. | 359/877 |
| 4,179,594 A * | 12/1979 | Coyle et al. | 200/310 |
| 4,318,590 A * | 3/1982 | Hanley | 359/214 |
| 4,570,893 A | 2/1986 | Ballantyne | 248/487 |
| 4,626,084 A * | 12/1986 | Kumai | 359/841 |
| 4,626,085 A * | 12/1986 | Suzuki | 359/841 |
| 4,657,362 A * | 4/1987 | Suzuki | 359/841 |

(Continued)

FOREIGN PATENT DOCUMENTS

GB  2267262  12/1993

(Continued)

OTHER PUBLICATIONS

"Intersection Negotiation Problems of Older Drivers," vol. 1 of Technical Report, National Highway Traffic Safety Administration (20 pages).

(Continued)

*Primary Examiner*—Ricky D. Shafer
(74) *Attorney, Agent, or Firm*—McCarter & English, LLP

(57) ABSTRACT

A rear view mirror assembly including a housing and a mirror frame mounted in the housing. A pivot base sub-assembly is rotatably mounted in the housing and in mechanical communication with the mirror frame. A stored energy device is fixed to the housing and coupled to the pivot base sub-assembly. A control knob is in communication with the pivot base sub-assembly and adapted to control a scanning position of the mirror frame. The rear view mirror assembly could include a stationary base portion attached to a vehicle door and a mirror housing pivotable with respect to the stationary base portion, such that the mirror housing can be pivoted to view a desired portion of the rear view spectrum.

24 Claims, 9 Drawing Sheets

U.S. PATENT DOCUMENTS

| | | | |
|---|---|---|---|
| 4,678,294 A | 7/1987 | Van Nostrand | 350/611 |
| 4,699,024 A * | 10/1987 | Iida et al. | 359/841 |
| 4,750,486 A | 6/1988 | Butler et al. | 128/303.1 |
| 4,786,156 A * | 11/1988 | Kotani et al. | 359/841 |
| 4,792,220 A | 12/1988 | Janowicz | 350/637 |
| 4,809,561 A * | 3/1989 | Tsuyama | 74/502.1 |
| 4,832,477 A * | 5/1989 | Torii et al. | 359/841 |
| 4,834,522 A | 5/1989 | Janowicz | 350/637 |
| 4,906,089 A | 3/1990 | Biondi et al. | 350/637 |
| 5,035,496 A | 7/1991 | An | 350/605 |
| 5,115,352 A | 5/1992 | do Espirito Santo | 359/855 |
| 5,126,885 A * | 6/1992 | Gray | 359/841 |
| 5,159,497 A | 10/1992 | Lynas | 359/855 |
| 5,189,561 A | 2/1993 | Hong | 359/843 |
| 5,205,182 A | 4/1993 | Gilbert | 74/502.1 |
| 5,383,057 A * | 1/1995 | Kimura et al. | 359/841 |
| 5,438,457 A | 8/1995 | Moore | 359/855 |
| 5,450,246 A | 9/1995 | Jain | 359/877 |
| 5,479,297 A | 12/1995 | Summers | 359/841 |
| 5,532,876 A | 7/1996 | Gauer et al. | 359/855 |
| 5,600,497 A | 2/1997 | Leonberger | 359/875 |
| 5,703,732 A | 12/1997 | Boddy et al. | 359/841 |
| 5,737,136 A | 4/1998 | Boggiatto | 359/843 |
| 5,745,310 A | 4/1998 | Mathieu | 359/843 |
| 5,793,543 A | 8/1998 | Kimura et al. | 359/875 |
| 5,798,881 A | 8/1998 | Mazurek et al. | 359/872 |
| 5,838,507 A | 11/1998 | Boddy et al. | 359/877 |
| 5,900,999 A | 5/1999 | Huizenga et al. | 359/877 |
| 5,914,824 A | 6/1999 | Valentino | 359/843 |
| 5,953,168 A | 9/1999 | Valentino | 359/843 |
| 5,969,891 A | 10/1999 | Otenio et al. | 359/871 |
| 5,984,482 A | 11/1999 | Rumsey et al. | 359/871 |
| 5,993,013 A | 11/1999 | Greiner | 359/603 |
| 6,193,380 B1 | 2/2001 | Jacobs | 359/843 |
| 6,350,037 B1 | 2/2002 | Adams | 359/843 |
| 6,386,717 B2 | 5/2002 | Miyabukuro | 359/879 |
| 6,390,630 B1 | 5/2002 | Ochs | 359/841 |
| 6,672,731 B2 | 1/2004 | Schnell et al. | 359/877 |
| 6,824,282 B1 | 11/2004 | Morrell | 359/877 |
| 6,834,972 B1 | 12/2004 | Medimurec | 359/872 |
| 6,916,100 B2 * | 7/2005 | Pavao | 359/841 |
| 2003/0107826 A1 | 6/2003 | Shafrir et al. | 359/841 |

FOREIGN PATENT DOCUMENTS

| | | |
|---|---|---|
| JP | 61041643 | 2/1986 |
| JP | 6227319 | 8/1994 |

OTHER PUBLICATIONS

Moran, "Radar Brings Vision to Cars' Blind Sports," The New York Times, Feb. 2, 2004 (5 pages).

"Spatial Disorientation," printout from http://www.transglobal-aerospace.co.uk/aeromedial/ch9.htm (18 pages).

"Outside Rear View Mirrors," 2004 Lexus Onwer's Manual (1 page).

Remarks Prepared For Jeffrey W. Runge, M.D., Administrator, National Highway Traffic Safety Administration, for the Opening Ceremony, 11th Wolrd ITS Congress, Nagoya, Japan, Oct. 18, 2004 (6 pages).

* cited by examiner

REAR VIEW MIRROR ASSEMBLY AND SYSTEM

CROSS-REFERENCE TO RELATED APPLICATIONS

This application is a continuation-in-part of U.S. patent application Ser. No. 11/159,001, filed Jun. 22, 2005, now pending, which claims the benefit of U.S. Provisional Patent Application Ser. No. 60/582,530, filed Jun. 24, 2004, the entire disclosures of which are each expressly incorporated herein by reference.

BACKGROUND OF THE INVENTION

Extensive improvements have been achieved in the performance, comfort, convenience and reliability of automotive vehicles during the century since their inception. Inexplicably, there has not been a corresponding improvement in the ability of vehicles to contribute to the avoidance of collisions, in particular, those which are attributable to inadequate rear view field of vision capability. During normal, daily operating activities there are often moments of exposure to the potential of such events. Many of these moments are related to the occurrence of certain critical locations in roadways.

Because of the diversity of types of critical locations in the world-wide road system, the problems of rearward vision requirements come in all shapes and sizes. They occur frequently, and at an ever-increasing rate because of the steady addition to the vehicle and vehicle operator populations, due to both demographics and economics.

The coupling of the uneven evolutionary progress of the above-mentioned vehicle development and its collision avoidance capability with economic and demographic trends has resulted in the growth of a serious, multi-faceted problem. To understand its scope, consider that in a recent ten year period, approximately 3,000 fatalities, 1,500,000 injuries, and $360 billion in property damages, attributed to side-to-side collisions alone, have been estimated, based on statistics gathered by the National Highway Traffic Safety Administration. Add to this the other categories of automotive operational difficulties, and the magnitude of the need for a major improvement in collision avoidance capability becomes evident.

Some examples of these periodic occurrences of critical operating conditions are entering intersections of roads that meet at acute angles, entering acute angle intersections into roadways from parking areas, entering high-speed roads from entrance ramps, and changing lanes on multi-lane roads. Also, many backing-up maneuvers, such as in parking lots and parking/exiting procedures in difficult curbside parking spaces, frequently qualify as critical. Thus, it addresses safety issues of paramount importance.

The current state of the art, operator-side exterior rear view mirror in automotive vehicles is located in a range of 25-30 inches, approximately, from the operator's eyes, depending on how the vehicle's manufacturer has mounted the mirror on the vehicle. Ideally, he or she needs to see completely to the left rear, by the above definitions of critical operating conditions, in order to know how much headway is available, so that a determination can be made whether the vehicle can safely enter a roadway, but the operator side mirror's field of vision is narrow, as will be discussed below. The same field of vision requirement is present for the passenger side, but here the location range for the exterior mirror is usually 48-55 inches from the operator's eyes, which adds more difficulty because of the additional narrowing of the reflected field of vision caused by the increased distance of the mirror from the operator.

In each case, therefore, because of the current state of the art of rear view mirror arrangements in automotive vehicles, the operator is forced to make a rapid, fairly extreme, turning and twisting movement of eyes, head, neck and body in order to fulfill a truly safe field of vision requirement, when confronted with the above noted situations. Such body movement creates additional hazards, and also is not realizable in many cases. The operator-side is the more frequently encountered condition because it is usually the side involved in accessing roadways via entrance ramps.

Entering intersections of roads that meet at acute angles (herein defined as less than 90 degrees to the axis of the vehicle) and entering high speed roads from entrance ramps are constant occurrences when operating an automotive vehicle. Acute angle intersection configurations are so diverse as to be almost infinite, given the size of the world wide road system. Therefore, the benefits that will accrue as a result of improvement to an operator's rear view capability are vast. The problem is slightly different for operator-side and passenger-side conditions, but the inventive principle described herein applies to both situations.

Entrance ramps are a form of acute angle intersection of roadways. Older roadways and highways have some very difficult entrance ramp situations to negotiate, and a vehicle frequently has little space in which to accelerate to the necessary speed for safe insertion into the flow of traffic. Hence, the need to have a clear vision as far back, and over as large a field of vision as possible, particularly on roads that make sweeping turns into the ramp/road intersection. On some of the newer roads, longer access lanes provide additional time for acceleration of an inserting vehicle, but these also tend to be very high speed roads, therefore requiring much higher insertion speeds which, in turn, reduces the time to make an informed decision as to go, or no-go. At these moments, what the operator needs most is maximum rear view vision and maximum accurate ranging information, so as to determine available headway in a very compressed window of time. Unfortunately, current rear view mirror systems do not provide sufficient rear view vision capability to meet that need.

Whether from parking areas in large malls or strip malls, or any other off-road parking, exiting from parking locations can be just as critical, even though in most of these situations road traffic speed is usually lower than on highways.

In a sense, because the speeds involved are usually higher than in entrance ramp situations, changing lanes on multiple lane roads is really an extreme case of acute angle intersection (becoming such a situation as the lane change maneuver begins). In the case of three, four or more lane high-speed "super highways," the degree of criticality is even higher. Most vehicle operators are generally aware of the traditional "blind spots" immediately to the rear on both sides of a vehicle, which result from, among other things that will be discussed in more detail below, a combination of individual model structural design (roof pillars) and the limitations of currently used mirror systems. However, few know the detail of how these individual factors contribute to the rear view problem, which is a major cause of difficulty for an operator in making a decision as to when to initiate a lane change. In other words, most drivers are really not aware of other "virtual blind spots," i.e., those associated with critical rear view situations. An example is the "virtual" blind spot in an acute angle intersection situation, when the intersection occurs at the end of a curve in the lane (or road) being joined.

Thus, whether negotiating an acute angle intersection or entering a left side or right side lane change, a back-up maneuver, or performing curbside parking/exiting, having improved field of vision capability beyond what is currently available is essential.

It is sobering to consider that despite more than a hundred years of evolution, automotive technology has not progressed farther in the amount of assistance provided to vehicle operators for this purpose.

The rear view vision systems currently available include an internal mirror and left and right side external mirrors that are adjustable to the physical characteristics, or the preferences of, the operator. The internal mirror and the operator-side mirror are flat, and the passenger-side mirror is usually convex. That convexity is occasioned by a desire on the part of the vehicle manufacturer to increase the operator's far side rear view field of vision from the relatively reduced amount available to him because of the distance between his eyes and the passenger side external mirror. But convexity does not solve all issues, as discussed below.

Some vehicle owners add supplementary mirrors adjacent to the external mirrors. They may also adhesively mount small, possibly convex, supplemental mirrors directly on the external mirrors. Sometimes, too, a convex mirror, or simulated convex mirror (by means of a series of small flat mirrors in a convex holding frame) is added in place of, or in addition to the internal mirror, in an attempt to improve rearward field of vision. Obviously, these actions by some owners are a further indication of the inadequacy of the rear view field of vision capability of present day vehicles. However, these additional devices also have their own deficiencies.

Supplemental external mirrors can send back multiple confusing images under the stress of a situation. A further deficiency is that under certain sun or night time lighting conditions they can cause glare back to the driver or occupants of the vehicle. Others have proposed mirrors that can be activated to scan small portions of the rear view spectrum (defined by the 180° degree arc rearward of a line perpendicular to the longitudinal axis of the vehicle) and then return to a normal driving position. The "blind spot," which such efforts address, only accounts for a small portion of the rear view spectrum. However, critical areas within the rear view spectrum are not addressed, such as portions of the rear view spectrum beyond the blind spot. These areas include, for example, a zone beyond the blind spot where critical vehicle maneuvering information can be acquired (e.g., whether or not it is safe to change lanes or merge), as well as a "peripheral zone" which represents a zone in which an object can be visually sensed with peripheral vision (and which varies from person to person).

Another problem with present-day rear-view systems is that they require turning the head, neck, and even the body of the operator to achieve a full rear view. This movement is dangerous and can lead to pulling on the steering wheel, causing the car to drift across lanes. A further serious danger is the possibility of temporary spatial disorientation occurring should the operator's head be rotated too suddenly in haste to return to the eyes-forward position. These problems also make obtaining a full rear view difficult or impossible for the elderly or the physically disabled. Indeed, solving such problems would be a tremendous benefit to drivers over the age of 65, particularly in view of the fact that this driving population is projected by the Insurance Institute for Highway Safety to increase from 27.3 million licensed drivers over the age of 65 in the year 2000 (representing approximately 14% of the driving population) to over 65.4 million in the year 2030 (representing approximately 26% of the driving population). Thus, eliminating the need for the over-the-shoulder look in order to obtain rear-view information would represent a major contribution to operational safety.

Accordingly, what would be desirable for a considerable improvement in collision avoidance, but has not yet been provided, is a rear view mirror assembly and system that can be operated to view any specific area within the entire rear view spectrum. The disclosed invention accomplishes this objective, and additionally, provides a significant, unexpected benefit of greatly reducing the operator's mental stress and fatigue associated with the hazards of critical road situations.

SUMMARY OF THE INVENTION

The present invention provides a rear view mirror assembly that includes a housing and a mirror frame mounted in the housing. A pivot base sub-assembly is rotatably mounted in the housing and in communication with the mirror frame. A stored energy device is fixed to the housing and coupled to the pivot base sub-assembly. A control knob is in communication with the pivot base sub-assembly and adapted to control a scanning position of the mirror frame.

The present invention also provides a rear view mirror assembly having a pivoting mirror housing and a stationary base portion. The stationary base portion includes a pivoting base assembly positioned therein, which is biased to a preset, normal driving position by a stored energy device. The pivoting base assembly is coupled to a control knob positioned on a vehicle door, and is interconnected with the mirror housing by a pivot shaft. The mirror housing can be pivoted about an arc to view a desired portion of the rear view spectrum by actuating the control knob, and automatically returns to a normal driving position after actuation of the control knob.

Further aspects, implementations, and advantages of the present invention will become more readily apparent from the description of the drawings and the detailed description of the exemplary embodiments of the invention as provided herein below.

BRIEF DESCRIPTION OF THE DRAWINGS

So that those having ordinary skill in the art to which the disclosed invention appertains will more readily understand how to make and use the same, reference may be made to the drawings wherein.

DETAILED DESCRIPTION

Figure 1:
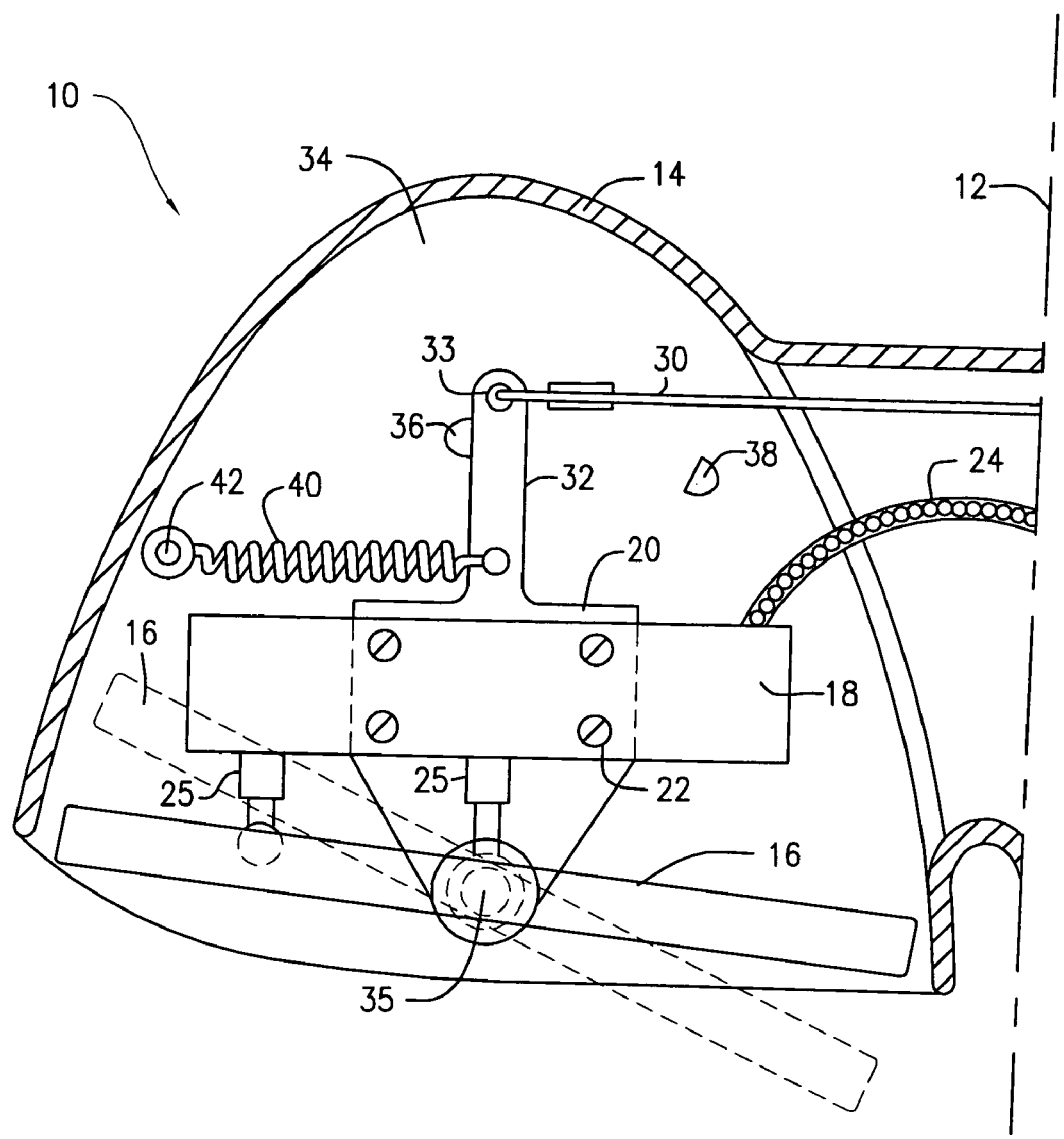
FIG. 1 is a cross-sectional top view of a scanning mirror assembly according to the present invention, which includes a center scanning pivot configuration.

Referring to FIG. 1, a rear view mirror assembly 10 is illustrated. Assembly 10 is mounted to an exterior 12 of a vehicle. Assembly 10 includes a housing 14 with a mirror frame 16 mounted therein. Mirror frame 16 is electrically coupled to a mirror assembly 18 which, in turn, is part of pivoting base sub-assembly 20 by being joined by fastener means 22. Fastener means 22 includes screws, bolts, and any other known fastening means. Mirror frame 16 is positioned by the vehicle operator by a switch 57 (see FIG. 6), which is located within the interior of the vehicle. The switch 57 is electrically coupled to mirror assembly 18 by wiring 24 or other known electrical means. The operator of the vehicle adjusts the mirror frame 16 by holding the switch 57, which in turn slowly moves the mirror frame 16 to permit reasonably accurate selection of the proper aiming location for normal vehicle operation according to his or her seat location, own physical dimensions, and personal opinion regarding mirror position with respect to the vehicle as a reference point. This is accomplished by using the electric switch 57 to position the horizontal and vertical axis rods 25 of the electrically operated exterior mirror assembly 18 (or manually, if the vehicle is so equipped).

Assembly 10 further includes a control knob 26 (see FIG. 2) which is connected to a cable 30, which, in turn, is connected to the pivoting base sub-assembly 20. Pivoting base sub-assembly 20 includes an arm 32 and the cable 30 is connected to an end 33 of the arm 32. Pivoting base sub-assembly 20 is attached to a bottom surface 34 of housing 14 by a rotatable pin 35 and positioned so as to allow end 33 to move from a first position in which end 33 is in contact with a first stop surface 36, which is illustrated in FIG. 1. The first position is the vehicle operator's fixed, secured, preferred operating position. End 33 can be moved to a second position in which end contacts a second stop surface 38. The stop surfaces 36, 38 can be suitably located to allow the mirror to pivot about a desired arc. The control knob 26 actuates the pivoting base sub assembly 20 between the first and second position, when the operator moves the knob 26. When pivoting base sub assembly 20 pivots and end 33 moves to stop surface 38, mirror frame 16 moves to the position shown in dashed lines and rotates about pin 35. Both first stop surface 36 and second stop surface 38 are fixed in the bottom surface 34 of housing 14. It should be noted that the stop surfaces 36 and 38 could be positioned as desired to accommodate various vehicle designs.

Assembly 10 also includes a biasing means or stored energy device 40 (the terms are used interchangeably throughout the application), such as a spring, or other like member. Biasing means 40 is fixed to the housing by an anchor pin 42 or other like anchoring device. When pivoting base sub assembly 20 is in the first position, the biasing means 40 is in a rest position, such as a coiled spring. When pivoting base sub assembly 20 is in the second position, the biasing means 40 is in an actuated position, such a spring under tension. Then, when the operator releases the control knob 26, pivoting base 20 rapidly, almost instantaneously, returns to the first position against the stop surface 36, under the urging of stored energy device 40, thus restoring the mirror frame 16 to the first position. In normal driving mode conditions, the pivoting base sub-assembly 20 is held against the stop surface 36 by a small amount of pre-set, stored energy in the stored energy device 40, for security against vehicle or other induced motion. That small amount is determined by the built-in positions of the stop surface 36 and anchor pin 42.

Figure 2:
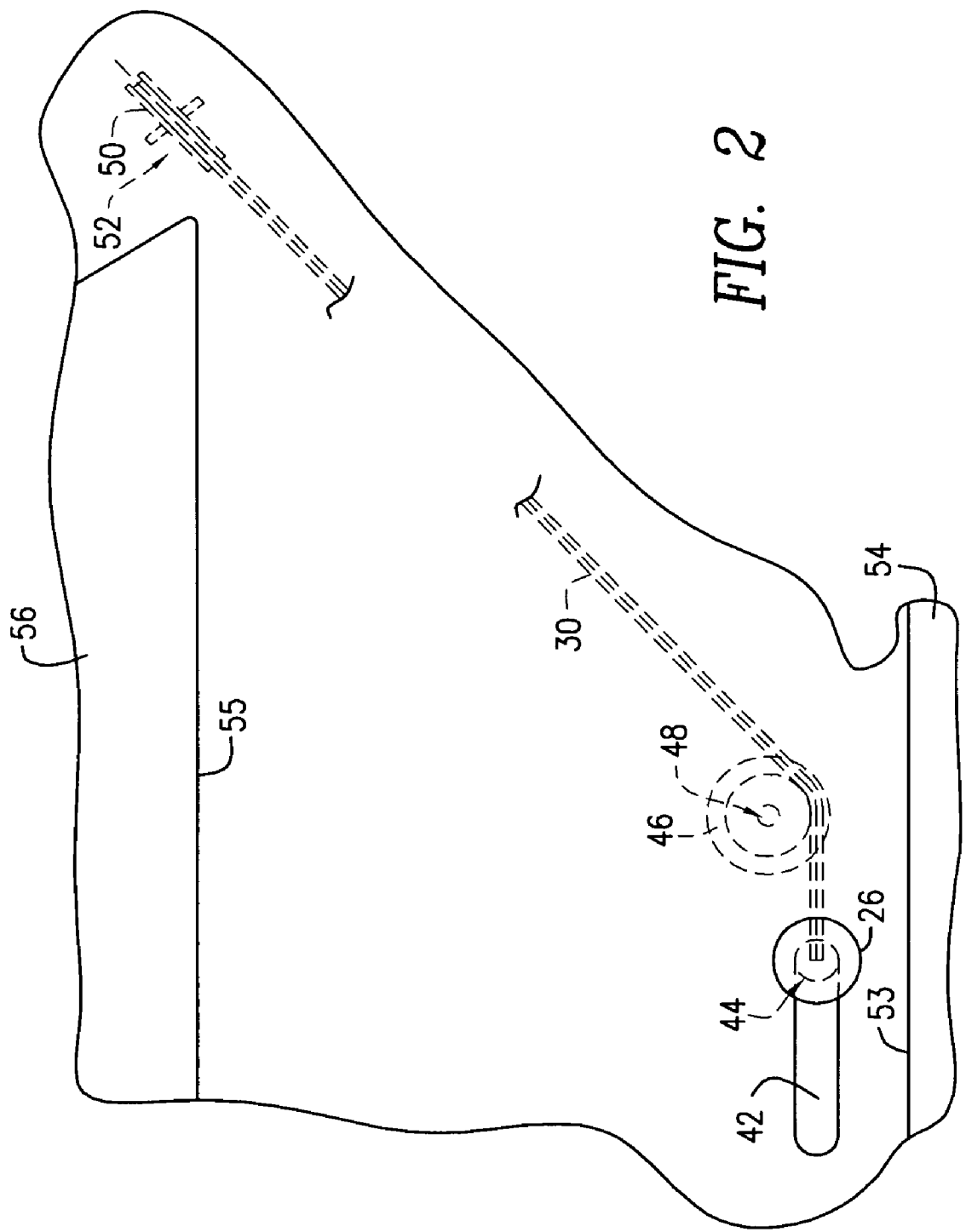
FIG. 2 is a schematic cross-sectional view of a vehicle operator's door, from the vehicle interior, showing the cable and routing pulleys of an exemplary embodiment of the actuating means used to transmit the vehicle operator's instructions to an operator-side external mirror.

Referring now to FIG. 2, a schematic cross-sectional view of an interior of a vehicle is illustrated. In an exemplary embodiment, assembly 10 further includes a slot 42 in the inside surface of the vehicle operator's door, along which a shaft 44 of the vehicle operator's control knob 26 for the scanning mirror assembly is guided. In addition, the cable 30 is fastened to the vehicle operator's control knob 26 by a threaded cable end and two lock nuts (not shown) for cable length adjustment, during installation in the vehicle, in order to remove any slack in the linkage, for the purpose of smooth, light, finger-tip operation. It should be noted that the control knob 26 could be substituted with any suitable means for actuating the rear view mirror assembly of the present invention, such as a wheel, lever, or other suitable control.

Assembly 10 further includes a first direction changing pulley 46 located on a shaft 48 and a second direction changing pulley 50 on a shaft 52. The cable 30 engages both pulley 46 and pulley 50. A top surface 53 of the vehicle operator's door mounted arm rest 54 is shown under the control knob 26. Also shown, for reference purposes, are the vehicle operator's windowsill 55 and the vehicle operator's window 56. The pulleys 46 and 50 are mounted on the door.

The vehicle operator can, by using the control knobs, therefore view any portion of the rear view spectrum that is desired without the need to shift, to any significant degree, his or her head away from the road ahead position. Assembly 10 almost completely removes the need for an operator's head to be turned for an over-the-shoulder look, thus assisting the driver with maneuvering the vehicle.

Figure 3:
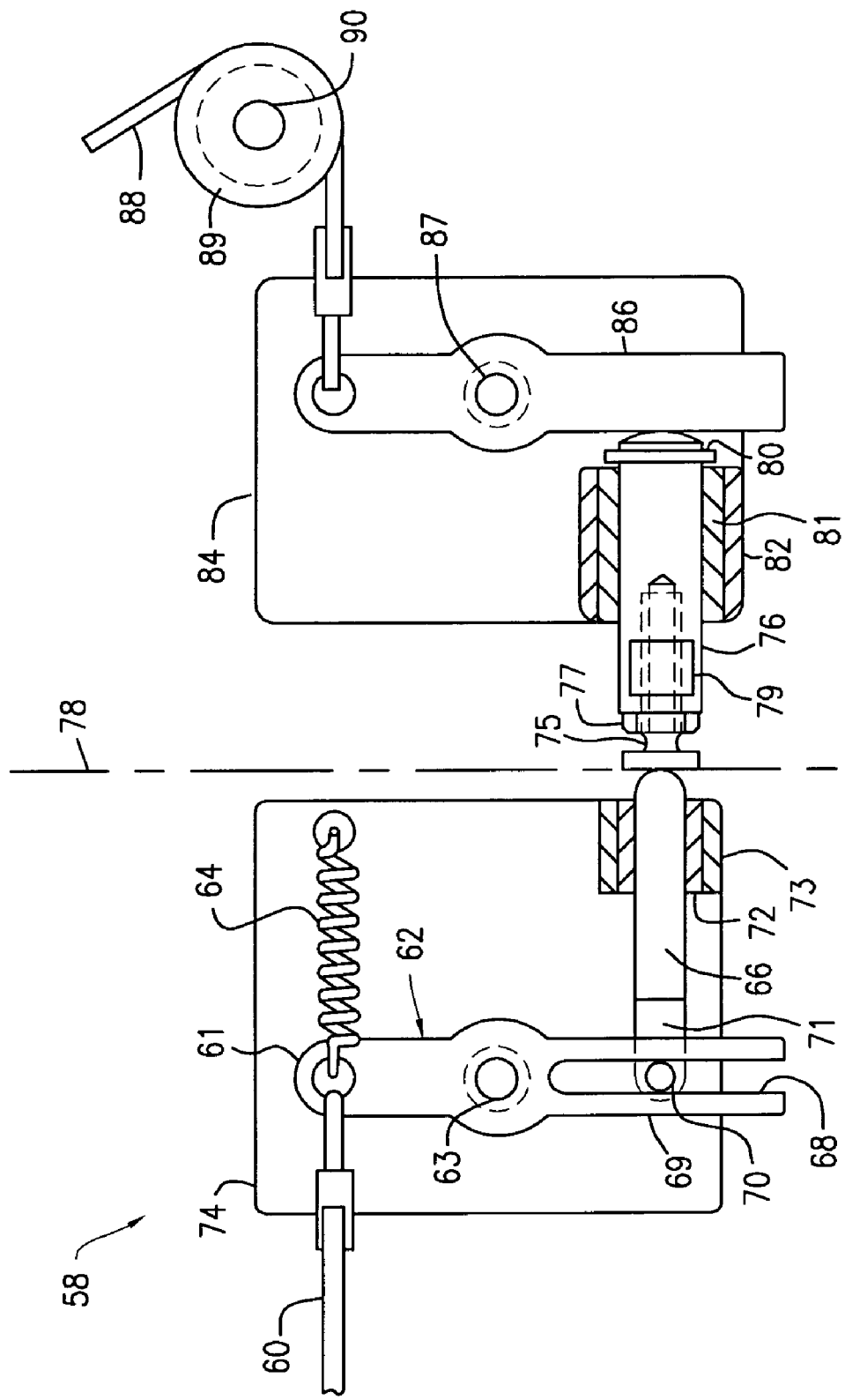
FIG. 3 is a schematic top view of an actuating means for actuation of a passenger side external mirror.

Referring to FIG. 3, in an exemplary embodiment, assembly 10 further includes a dual rocker arm mechanism 58 for transmitting an actuating cable action through the interface of the vehicle body and the passenger-side door, into a passenger-side scanning mirror assembly. A separate control knob (not shown) may be added to actuate the passenger side mirror. Dual rocker mechanism 58 includes a cable 60 that is connected to an end 61 of a first rocker arm 62, which pivots around a fixed shaft 63, against the relatively light tension of a stored energy device 64. A first push pin 66 is shown engaged in a captive, but sliding relationship, in a slot 68 in an opposing end 69 of first rocker arm 62, by means of guide pin 70 installed in a flattened end 71 of first push pin 66. The full diameter of pin 66 slides in a bushing 72, mounted in a boss 73 of a mounting bracket 74. Bracket 74 with the first rocker arm 62, stored energy means 64, and bushing 73, in turn, is mounted to the vehicle body by fastening means (not shown) to the inside of the dashboard side wall on the passenger side, in a position opposing, through a hole in the dashboard sidewall, the head of an adjusting screw 75, which is locked in place at the end of a second push-pin 76 by lock-nut 77. The approximate mid-line in the gap between the right end surface of the dashboard and the passenger-side door, when the door is closed, is shown at 78. Not shown are the opposing surfaces of the dashboard and the door.

Adjusting screw 75 is set and locked by lock-nut 77 so as to accommodate vehicle fabrication and assembly tolerances in such a way that, with the door closed securely, the two push pins just make contact. Wrench flats 79 aid in making that adjustment. A retaining ring 80, at the rounded end of pin 76 provides captivation for the periods when the passenger door is open. Pin 76 slides in the bushing 81 which is mounted in the boss 82 of a mounting bracket 84 which, in turn, is mounted in the interior of the passenger door by means not shown. Before final lockdown of bracket 84, it should be set so that the amount of gap, if any, between retaining ring 80 and bushing 81, is between zero and negligible, so as to eliminate any slack in the transmission of motion. A second rocker arm 86 pivots on fixed shaft 87, and engages a cable 88, which turns around a direction changing pulley 89 on shaft 90, on its way into engagement with the pivoting base sub-assembly 20 (shown in FIG. 1).

The operation of the passenger-side scanning mirror assembly is the same as that for the operator side. Actuating the separate operator control knob for the passenger-side unit causes the cable 60 to transmit its pull to cable 88 through the door gap 78 by way of the dual rocker arm assembly 58, and on to the passenger-side pivoting base sub-assembly 20 (shown in FIG. 1) which, in turn, is automatically returned to the operator's fixed, secured preferred mirror operating position for normal vehicle operation by the stored energy means 40 (shown in FIG. 1), when the demand is removed. Light tension stored energy means 64 acts to hold the passenger-side control knob against its forward stop, thus insuring that no slack appears in the cable run around the direction changing pulleys associated with the cable 60. The passenger-side control knob can be configured as desired. For example, it could be actuated by pulling the knob away from the dashboard, pushing the knob, sliding the knob, etc.

The passenger-side actuating control knob (not shown) is located at the dashboard, within arm-resting easy reach position. It is currently contemplated that the control knob for the passenger-side external mirror will be arranged so that it is pulled from the instrument panel to initiate scanning action (or from a small cantilever support affixed to or integral with the steering column). The cable 60 would then be routed behind the dashboard to the point where it attaches to the first rocker arm 62 described above.

Thus, both operator-side and passenger-side scanning mirror assemblies can easily and quickly be controlled by the vehicle operator's outboard arm, resting on the arm-rest if so desired, permitting relaxed, total rear view information gathering. The operation of the invention will be smooth and relatively effortless, since it is contemplated that the rotating parts will use very low friction, permanently lubricated bushings (or ball bearings) and shaft combinations, and the lengths of the moment arms for each individual vehicle model are to be designed for appropriate mechanical advantage, when and where needed.

With regard to the instant indication of mirror position at a pre-selected location, or more if desired, along the arc of the rear view spectrum, research, analysis and experimentation have shown that on a typical automotive vehicle, most vehicle operators usually tend to set external mirrors for normal operation so that the plane of the mirror's surface lies within a range of approximately 75 to 80 degrees with respect to the longitudinal axis of the vehicle. This permits the operator to see the rear-most side portion of their vehicle. Some operators will set their external mirrors somewhat above that number in an attempt to see the well known blind spots. This is a technique recommended by some automotive vehicle operator organizations. But, because of the limited field of vision of a fixed mirror position, many other critical situation portions of the rear view can not be seen, as will be explained below. Among these are the ones related to the important problem of merging at acute angles, as outlined above.

Figures 4A, 4B:
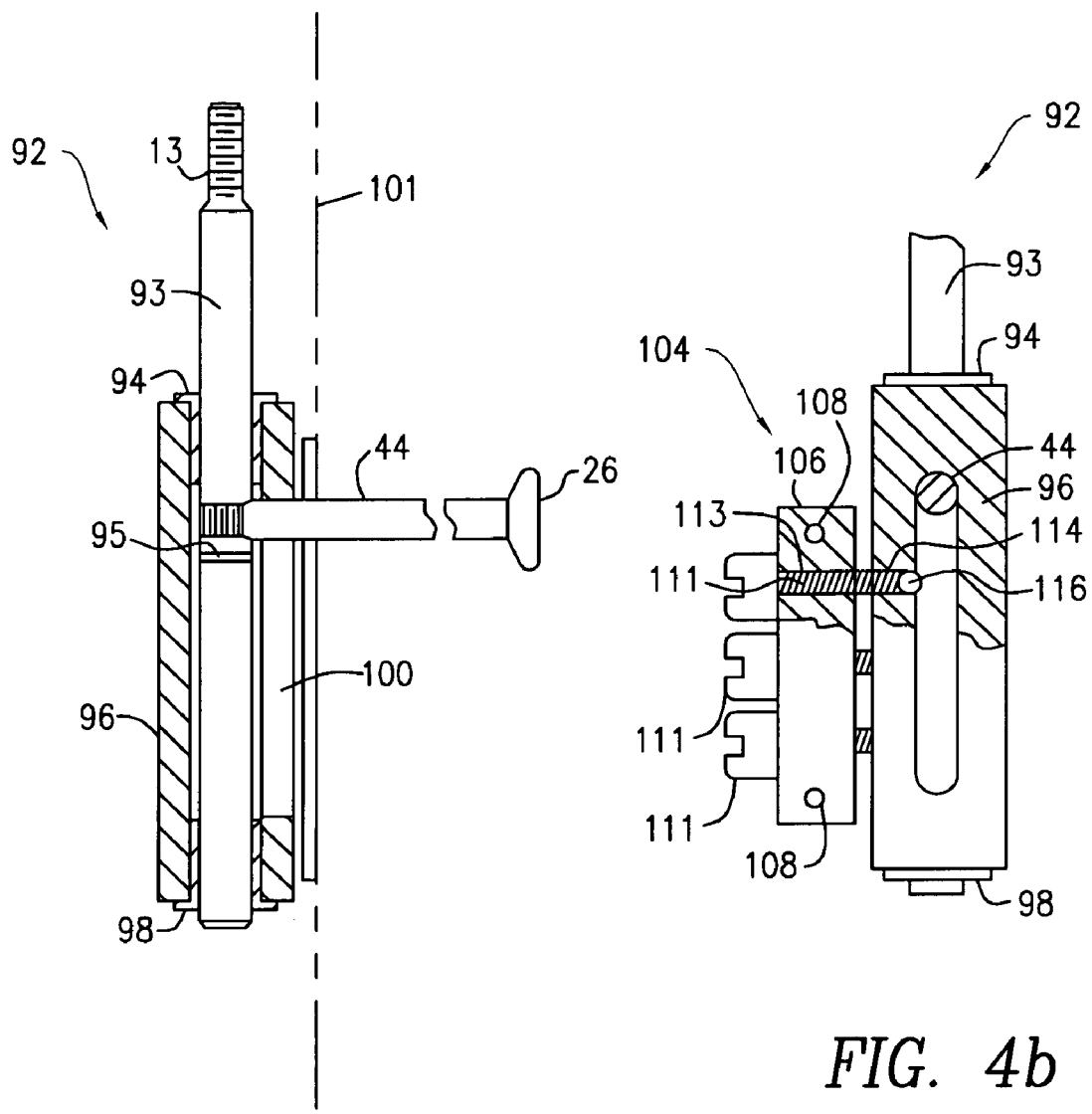
FIGS. 4a-4b are cross-sectional views of the position indicating means of the present invention.

A position locating and signaling arrangement can be made in many well known ways, and can be installed in any desired place in the system. One such arrangement is shown in FIGS. 4*a*-4*b*, which are cross-sectional views showing a position indicating means 92 according to the present invention. The stem 44 of control knob 26 is interconnected with a shaft 93, and is moveable axially along a guide slot 100 formed in a shaft housing 96. The guide slot 100 could include an elastomeric foam or other desired material positioned thereabout. Bushings 94, 98 are mounted at opposite ends of the shaft housing 96, and slideably engage the shaft 93. A shaft end 13 is attached to cable 30 (shown in FIG. 1) by means of a break-away turnbuckle fitting (not shown) designed to accommodate both initial rigging and protect against component damage in the event the housing 14 (shown in FIG. 1) is of break-a-way design. Shaft housing 96 is rigidly fastened to a surface 101 of the interior structure of the operator's door.

As shown in FIG. 4*b*, a detent assembly 104 is provided for indicating one or more pre-set mirror positions to a user when the control knob 26 is operated. The detent assembly 104 includes a housing 106 having mounting apertures 108 for receiving any desired fasteners, such as screws, bolts, etc., for mounting the detent assembly 104 to a desired surface, such as the surface 101 (FIG. 4*a*) of the operator's door. One or more adjustable detent screws 111 are threadably engageable with one or more threaded apertures 113 formed in the housing 106, and extend through one or more apertures 114 formed in the shaft housing 96.

Each screw 111 includes a spring-biased detent ball 116 at an end thereof for contacting a groove 95 formed in the shaft 93 when the control knob 26 is actuated, so as to provide a tactile indication or "feel" corresponding to one or more mirror positions. This tactile indication or feel is provided when the groove 95 arrives at or passes by each detent ball 116. The groove 95 could be V-shaped or have any desired shape, and could be positioned in any desired orientation on the shaft 93 (e.g., transverse to the longitudinal axis of the shaft 93). The screws 111 could be adjusted for the amount of "feel" desired by a user, and one or more shimming washers (e.g., washers having thicknesses of 0.005 to 0.010 inches) could be positioned between the heads of the screws 111 and the housing 106 before locking the screws 111 into place. Alternatively, the detent assembly 104 could be configured so that detent balls 116 of the detent screws 111 contact the stem 44 as the control knob 26 is actuated, to provide the tactile indication. Thus, for example, the detent assembly 104 could be mounted parallel to the longitudinal axis of the shaft housing 96 and on the same side of the surface 101 as the shaft housing 96, such that the stem 44 contacts the detent balls 116 of the detent screws 111. In such a configuration, the groove 95 would not be required. Additionally, the detent assembly 104 could be mounted on the vehicle door so that it is accessible by a user to allow for adjustment of the detent screws 111 as desired. As will be readily appreciated, any desired configuration and positioning of the detent assembly 104 could be provided without departing from the spirit or the scope of the present invention.

Figure 6:
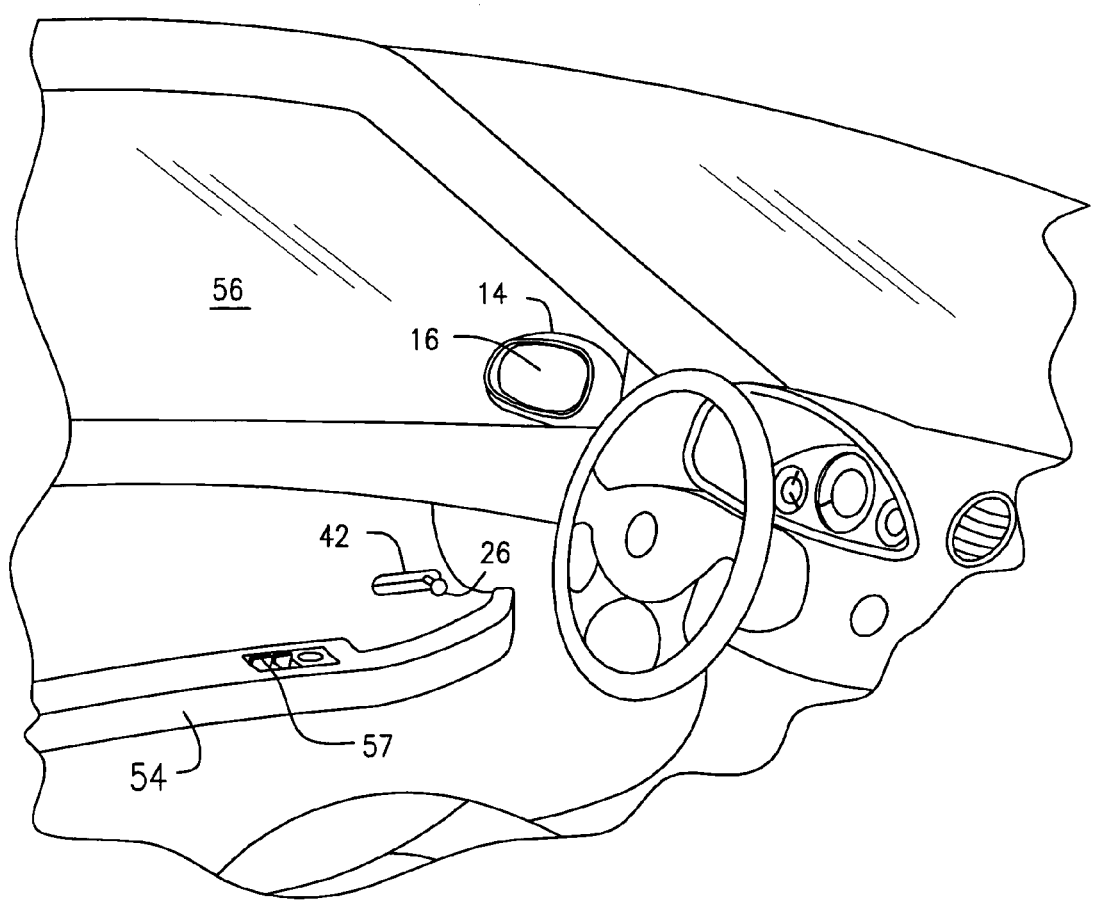
FIG. 6 is a perspective view showing the rear view mirror assembly of the present invention installed in a vehicle.

FIG. 4*b* shows the shaft 93 in the "normal" driving position, wherein the mirror can be adjusted as desired using the switch 57 (see FIG. 6). It is contemplated that the first (top) detent screw 110 will be pre-set to signal the arrival of the mirror at the "blind spot" position (approximately 12-15 degrees of rotation from the normal driving position). The last (bottom) detent screw 110 is pre-set to signal the scanning mirror approaching the end of the scanning range. The center detent screw 110 could be pre-set to indicate one or more locations desired by a user. It should be noted that any desired number of detent screws 110 could be provided, and it is only necessary to drill and tap a small threaded hole in the housings 106 and 96 to provide an additional detent screw. Further, the detent housing 106 could be eliminated and threaded holes could be provided in bosses formed in the housing 96. Further, the detent screws 110 could be headless, or they could be adjusted using an Allen wrench or other desired tool. Moreover, the detent screws 110 could be positioned so that equally-divided arcs of the rearview quadrant are indicated to the user when the control knob 26 is actuated. Importantly, the position indicating means 92 of the present invention can be easily configured by vehicle manufacturers without incurring significant expense and effort.

As will be appreciated by those skilled in the art, any suitable means for indicating the position of the mirror assembly of the present invention could be provided. For example, a plurality of switches or other sensors could be provided for sensing the position of the control knob (and hence, the mirror assembly) during operation of the control knob, and an audible (e.g., buzzer) or visual (e.g., lamp or light-emitting diode (LED)) indication, or both, could be provided for conveying position information to the driver.

Figure 5:
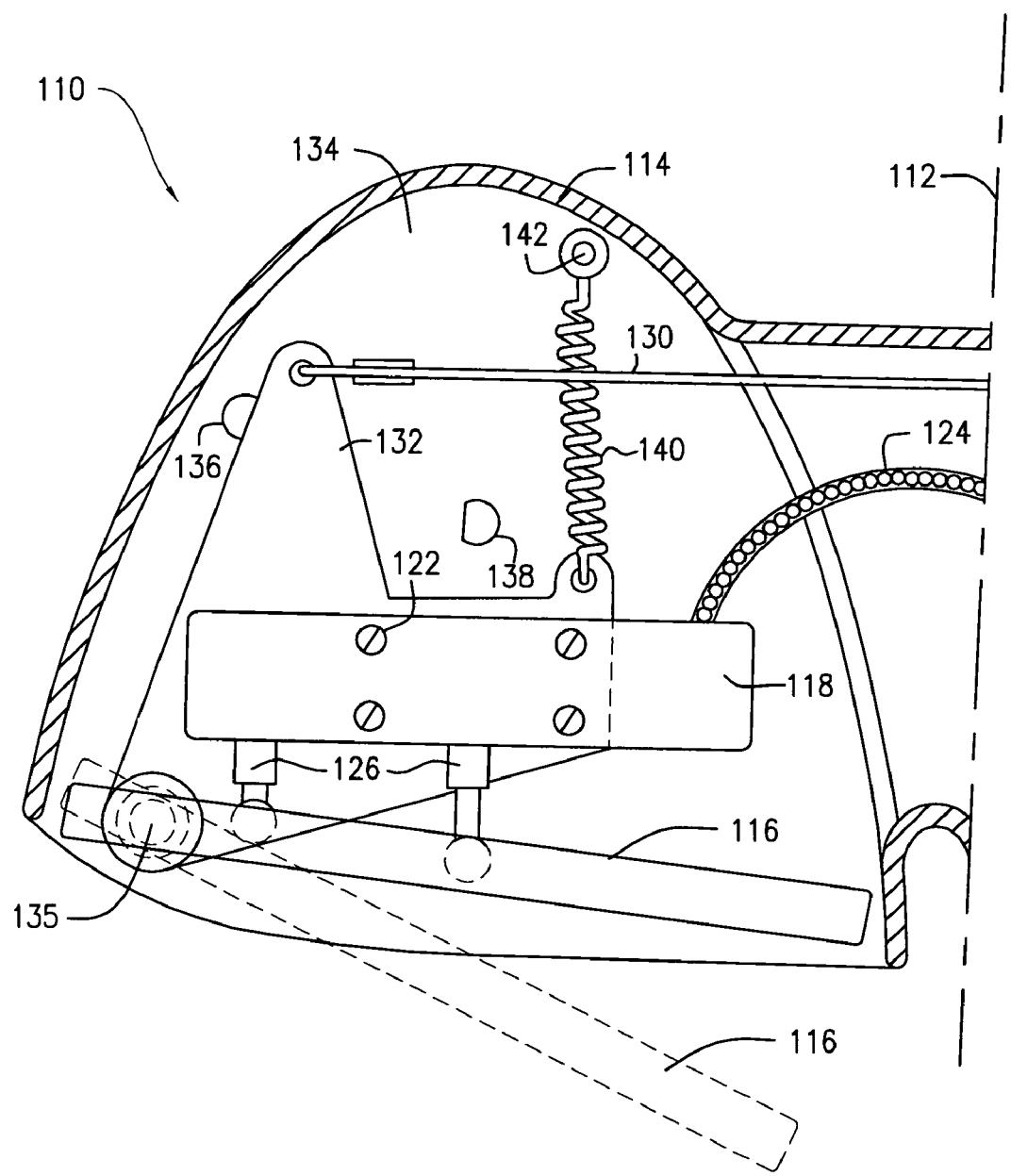
FIG. 5 is a cross-sectional view of another embodiment of the scanning mirror assembly of the present invention, which includes an outboard scanning pivot configuration.

Referring to FIG. 5, another embodiment of the rear view mirror assembly is illustrated as reference number 110. The assembly 110 is substantially similar to the assembly 10 described above with reference to FIG. 1, and therefore like reference numerals preceded by the numeral "1" are used to indicate like elements. Horizontal and vertical access rods 126 are used to position the mirror assembly in a proper aiming location for normal vehicle operation. Arm 132, like arm 32 in FIG. 1, extends from the pivoting base subassembly and cable 130 is connected to an end of arm 132. As illustrated pin 135 is located at an end of the mirror frame 116 so that the mirror frame can rotate from the first position to the second position, which is illustrated in dashed lines. In addition, the biasing means 140 has been moved to accommodate the different design. The cable 130 connects to the interior of the vehicle in a similar manner as described above with reference to FIG. 2. It should also be noted that the assemblies 10 and 110 can be located on either the left or the right side of the vehicle to accommodate both sides of the vehicle.

FIG. 6 is a perspective view showing the rear view mirror assembly of the present invention installed in a vehicle door. As can be seen, the control knob 26 and slot 42 are positioned on the vehicle door so that the control knob 26 is within easy reach of an operator's fingers when the operator's arm is resting on the armrest 54. In this way, both the control knob 26 and the mirror switch 57 can be easily accessed by a user to control the mirror 16. The control knob 26 could be provided at any desired location, such as on the column of the vehicle's steering wheel, or at any desired location.

The rear view mirror assemblies 10 and 110 of the present invention possess the necessary operating flexibility to accommodate vehicle operators of differing philosophies regarding mirror positioning, and vehicle operators of all physical sizes. It provides total operating awareness of a vehicle's relationship to all other vehicles (or objects) rearward of the operator's "eyes forward" vision field, without the need to constantly engage in looking-over-the-shoulder maneuvers to each side, with their attendant risks.

As noted above, if the vehicle operator prefers to see the rear of the vehicle when in the normal driving mode, it would require setting the plane of the mirror face about 75 to 80 degrees from the longitudinal axis of the vehicle. If the need for a constant reference point in the normal driving mirror operating position is not felt, he or she can choose to use the "blind spot" location for the normal mirror operating position. This would be accomplished by adjusting the secured and fixed preferred operating position another 13-15 degrees (approximately) outward, and moving and securing the detent device at the far end of the scanning range in order to eliminate the tactile signal that it provides. The scanning feature in the mirror would then just be used for acute angle intersections, lane changing, backing-up and parking operations. On the other hand, the vehicle operator who prefers having the rear end of the vehicle as a constant reference point can use the detents tactile signal to instantly identify "blind spot" locations, as the need arises, together with the rest of the scanning mirror's capabilities. Further, the user can adjust the mirror using the control knob 26 to view a desired portion of the rear view spectrum, hold the mirror at the desired position (dwell) for a desired period of time, release the control knob 26 so that the mirror returns to its original position, and repeat as desired or necessary.

Figure 7:
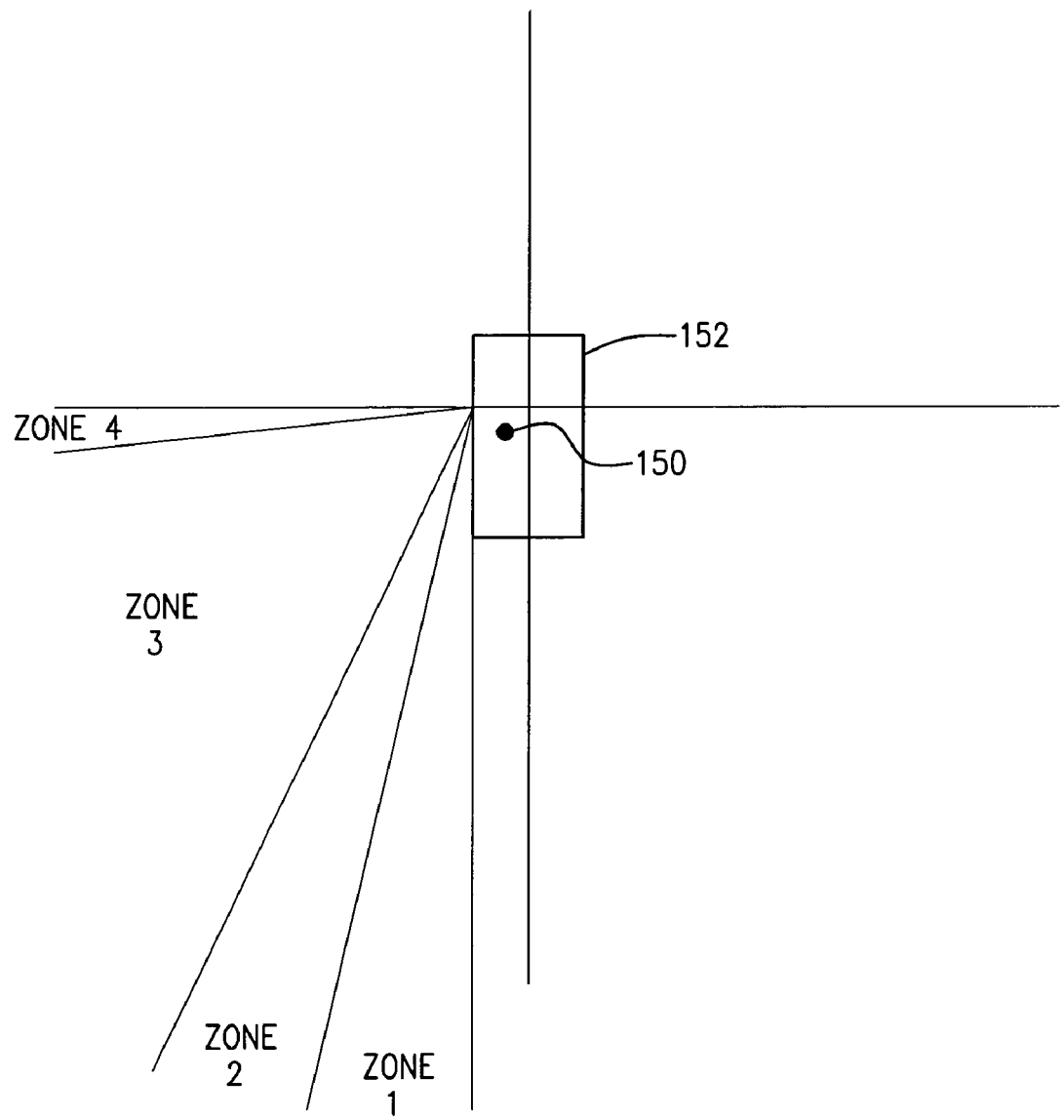
FIG. 7 is a diagram showing various fields of view that are obtainable using the rear view mirror assembly of the present invention.

As shown in FIG. 7, the assemblies 10, 110, and 200 (discussed below with respect to FIGS. 8-9) allow a driver 150 of a vehicle 152 to view the normal viewing sector (indicated as "Zone 1"), the "blind spot" (indicated as "Zone 2"), a third zone beyond the blind spot (indicated as "Zone 3"), and a fourth zone (indicated as "Zone 4"). Zone 1 corresponds to the field of view available with the recommended mirror setting for normal driving. Zone 2 corresponds to the blind spot. Critical maneuvering information can be acquired in Zone 3, such as when entering an acute-angle intersection, backing up, or parking. Zone 4 corresponds to visual information typically acquired through peripheral vision. Thus, as can be readily appreciated, the assemblies 10, 110, and 200 of the present invention allow for a wealth of vital visual information to be acquired in addition to information normally found within the blind spot.

Further analysis and experimentation have shown that if the rotational range of the mirror and mirror frame subassembly extends through Zone 3, it will completely satisfy the side rear view requirements, namely, both rear side "blind spots" and the very broad range of rear view capability necessary for practically all configurations of acute angle intersections and backing-up and parking maneuvers. Exemplary embodiments of assemblies 10, 110, and 200 therefore provide a solution for the rear view and "blind spot" dilemmas.

Thus, upon vehicle operator demand, the exterior mirrors can be independently, rapidly positioned to meet the immediate needs of the driving environment, and then automatically, rapidly, almost instantaneously, returned to their normal driving position when the demand is removed. Or, if desired, the vehicle operator can shift to any other position within the pivoting range, in order to examine any other segment of the expanded rear view arc, dwell for any length of time, or in any sequence of viewing, in order to satisfy the needs of the moment. Indeed, the operator can even direct the mirror at a particular area and while the automobile is moving, maintain the mirror at a position to continue to view and monitor the particular area as a particular maneuver is executed by adjusting or holding the position of the mirror. In any event, the vehicle operator practically never needs to turn his or her head to the rear, for any reason, for any rear view information requirements.

Figure 8:
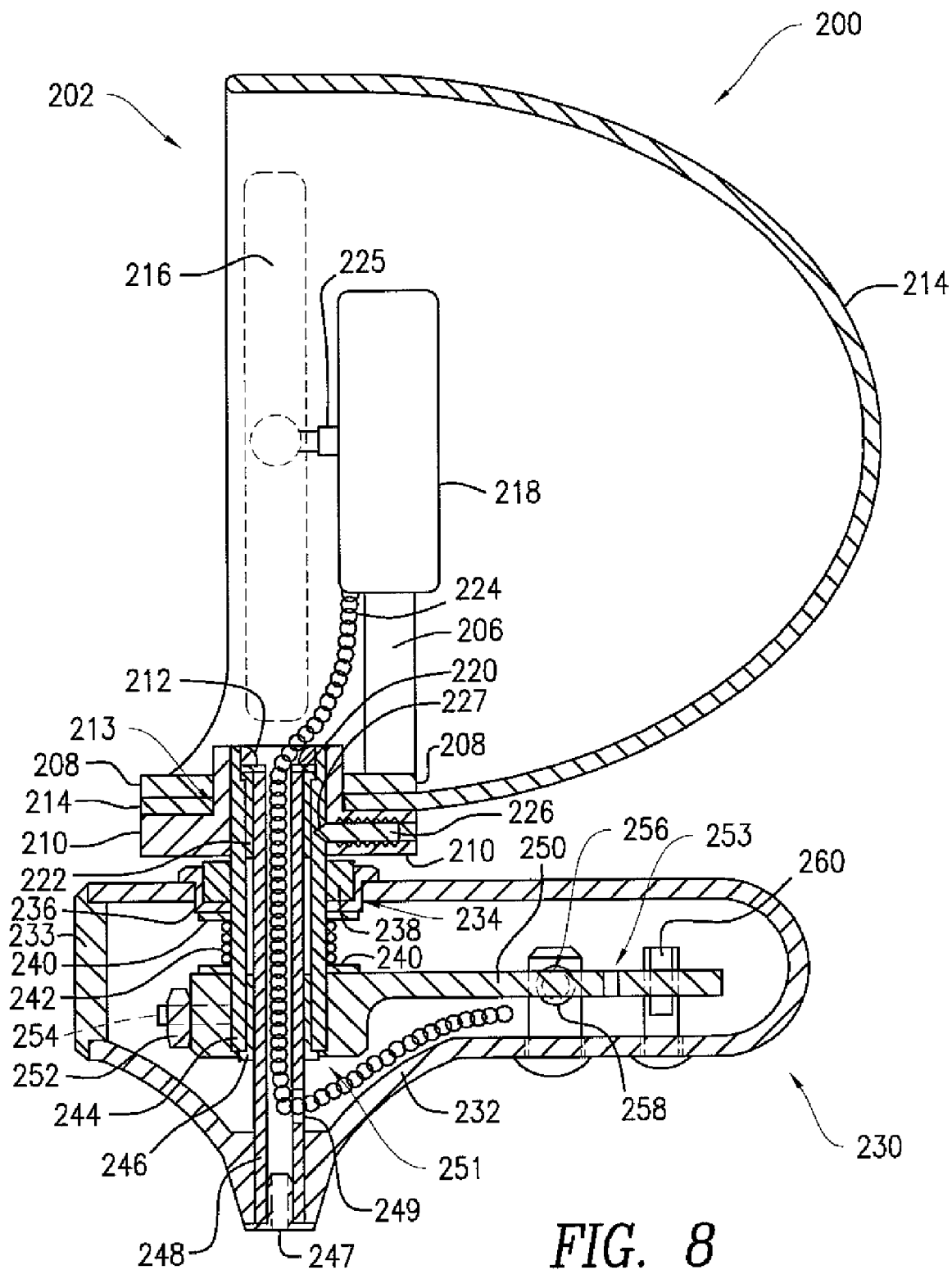
FIG. 8 is a cross-sectional view of another embodiment of the rear view mirror assembly of the present invention, which includes a pivotable mirror housing.

FIG. 8 is a cross-sectional view showing the rear view mirror assembly of the present invention, indicated generally at 200, having a pivoting mirror housing 202 and a stationary base portion 230, which is mountable to a vehicle door. The pivoting mirror housing 202 includes a housing assembly 214 and a mirror frame 216 interconnected with a drive motor 218 by actuator arms 225. The motor 218 is interconnected with a standard mirror position control switch (such as the switch 57 of FIG. 6) via an electrical cable 224. The drive motor 218 could be mounted on a post 206 attached to the housing assembly 214. Importantly, the entire mirror housing 202 pivots with respect to the base portion 230 to allow a driver to view a desired portion of the rear view spectrum.

The base portion 230 includes a hollow mounting strut 232, which could be attached to a vehicle door in any suitable manner. A fixed shaft 248 is interconnected at a bottom end to the strut 232 by means of a press fit, and an end cap 247 could be provided at the bottom end of the fixed shaft 248. A pivoting base assembly 250 is provided, and includes an aperture 251 for receiving a pivot shaft 244. A set screw 254 and lock nut 252 could be provided for engaging the pivot shaft 244 and retaining same in a fixed position with respect to the pivoting base assembly 250. Optionally, the pivot shaft 244 could be permanently attached to the pivoting base assembly 250, or formed integrally therewith. The electrical cable 224 is routed through the interior portion of the fixed shaft 248 and through an aperture 249 formed in the fixed shaft 248. The cable 224 could then be routed as desired to mirror control circuitry associated with the motor 218. The pivot shaft 244 is positioned about (coaxially with) the fixed shaft 248, such that the pivot shaft 244 rotates with respect to the fixed shaft 248. Permanently-lubricated bushings 222 and 246 could be provided between the pivot shaft 244 and the fixed shaft 248.

The pivot shaft 244 and fixed shaft 248 extend through an aperture 234 formed in the mounting strut 232. A packing gland 236 and anti-friction packing 238 could be positioned in the aperture 234 and about the pivot shaft 244 so as to seal the stationary base portion 230 and its associated components from weather. A thrust spring 242 and washers 240 could be positioned about the pivot shaft 244 and between the pivoting base assembly 250 and the packing gland 236 to exert a light biasing force that suppresses vibration which may arise from vehicle operation. A fixed thrust bearing ring 212 and a permanently lubricated thrust bearing washer 220 are positioned at the top of the pivot shaft 244 and retain the pivot shaft 244 in position axially with respect to the fixed shaft 248.

A bottom clamp 210 is attached to an end of the pivot shaft 244, and is retained in place by a set screw 226 which engages the pivot shaft 244. Optionally, the bottom clamp 210 could be permanently attached to the pivot shaft 244. The clamp 210, pivot shaft 244, and fixed shaft 248 extend through an aperture 213 formed in the housing assembly 214. A top clamp 208 engages the bottom clamp 210 so as to interconnect the housing assembly 214 with the pivot shaft 244. It should be noted that the set screw 226 could be peened over or otherwise permanently affixed to the bottom clamp 210 so as to prevent theft of the mirror housing 202 that could result from removing the set screw 226 and disengaging the mirror housing 202 from the pivot shaft 244.

Further, the set screw 226 could be substituted with a strong, spring-biased detent screw that engages a dimple 227 formed in the pivot shaft 244, so as to provide break-away protection in the event that the mirror housing 202 inadvertently comes into contact with the side of a garage door opening, parking meter, ticket dispensing machines, toll collection baskets, etc.

The pivoting base assembly 250 includes an aperture 253 to which a cable, such as the cable 30 of FIG. 1, could be attached, so as to interconnect the pivoting base assembly 250 with a control knob, such as the control knob 26 of FIG. 2. One or more direction-changing pulleys, such as the pulleys 46 and 50 discussed above with respect to FIG. 2, could be provided for routing the cable to the control knob. During operation of the control knob, the cable exerts a force against the pivoting base assembly 250, causing the assembly 250, the pivot shaft 244, and the housing assembly 214 to rotate about the fixed shaft 248. Thus, the entire mirror housing 202 can pivot with respect to the base portion 230 to view a desired portion of the rear view spectrum. Further, the position indicating means discussed above with respect to FIGS. 4a-4b could be used in conjunction with the control knob to provide a tactile indication corresponding to the position of the mirror housing 202 during scanning. Additionally, an audible (e.g., buzzer) or visual (e.g., light or LED) indication could be provided for indicating the position of the mirror housing 202.

The pivoting base assembly 250 could be biased by means of a stored energy device (e.g., spring) 258 attached to an anchor pin 256, so that the base assembly 250, the pivot shaft 244, and the entire mirror housing 202 are urged to a normal driving position defined by a stop pin 260 after actuation of the control knob by the user. The stop pin 260 could be positioned at any desired location, so as to accommodate any vehicle design. The stop pin 260 and the anchor pin 256 could be threadably engaged with the mounting strut 232, or otherwise attached thereto or formed integrally therewith. A side cap 233 could be attached to the mounting strut 232. Of course, the construction of the mirror housing 202 and the base portion 230 could vary as desired without departing from the spirit or scope of the present invention. For example, it is conceivable that a motor drive could be provided in the base portion 230 for electrically positioning the mirror housing 202, as well as any other suitable positioning means, including, but not limited to, hydraulic, pneumatic, vacuum, magnetic, or other positioning means.

Figure 9:
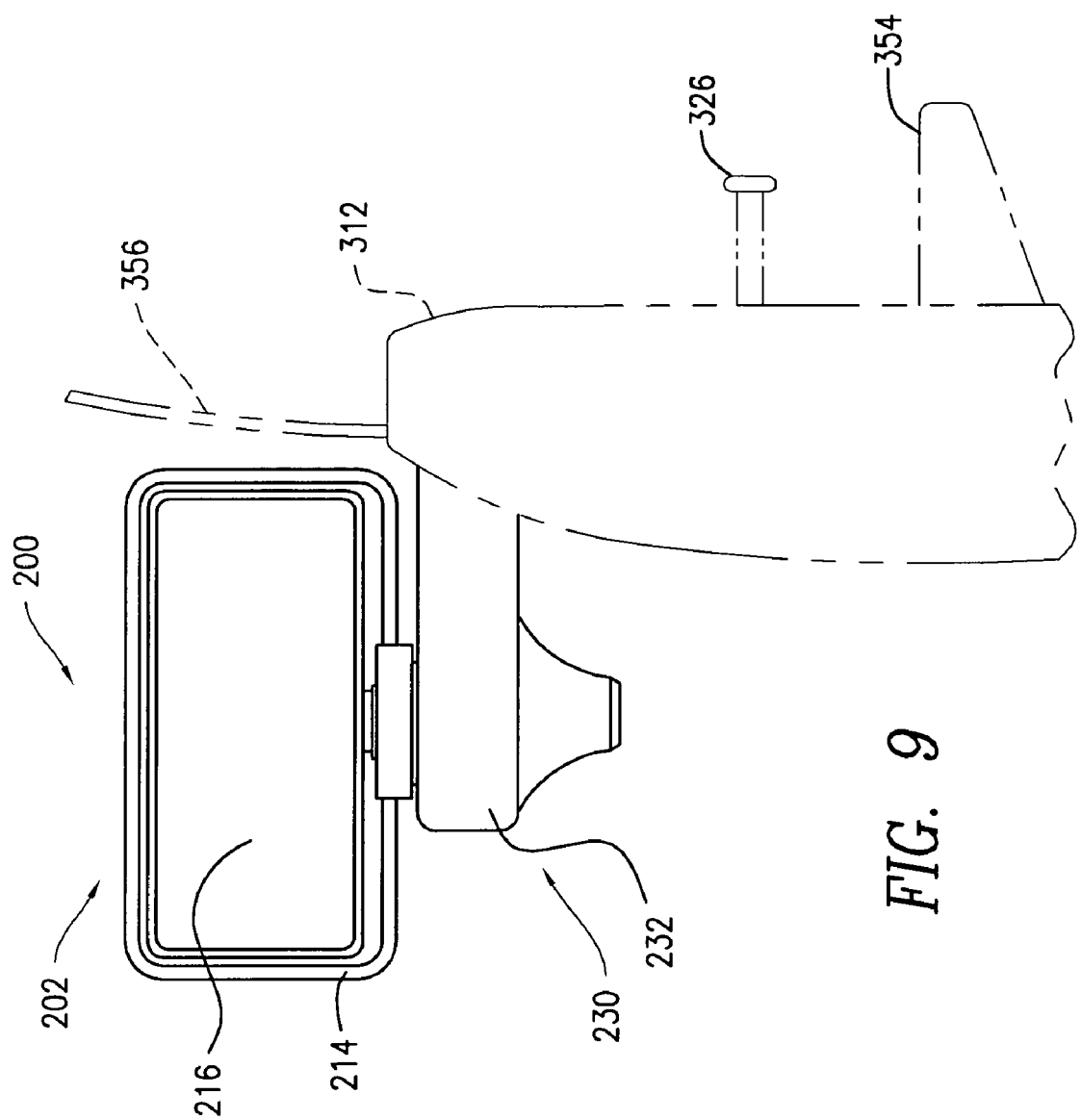
FIG. 9 is a forward-looking view showing the rear view mirror assembly of FIG. 8 installed on a vehicle door.

FIG. 9 is a forward-looking view of the rear view mirror assembly 200 shown in FIG. 8. The mounting strut 232 could be mounted to a vehicle door 312 having a window 356 using any suitable interconnection, such as by means of integral studs that could be formed in the mounting strut 232, wherein the studs would be aligned with corresponding apertures formed in the door 312 and fasteners would be inserted through the apertures and engaged with the studs to mount the strut 232 to the door 312. The entire mirror housing 202, including the housing assembly 214 and the mirror frame 216, can be moved to a desired scanning position by actuating the control knob 326, which could be positioned near an armrest 354.

The controlled scanning action of the invention also permits the use of flat mirrors instead of convex mirrors for the passenger side. Thereby, the probability of errors of judgement in estimating range under critical circumstance can be reduced dramatically by eliminating the large trade-off of clarity and ranging capability for the limited additional field of vision which accompanies the use of the convex shape.

The invention also lends itself to a special adaptation, which will serve as an alternate way of coping with the passenger-side "blind spot" problem. By coupling a double action solenoid actuator with an automatic spring-return electric switch (or a single action solenoid actuator with stored energy return), to the pivoting base sub-assembly and removing the actuating means cable and the stored energy components and operating knob of the preferred embodiment shown above, a unit will result that can serve as an interior mirror which, at the touch of an electric switch mounted on the steering wheel or on a steering column stalk, instantly aim the mirror at the passenger-side rear door window and passenger-side portion of the vehicle rear window. This is the "blind spot" location, the one at which an approaching "blind spot vehicle" overlaps the rear window and the rear side window, in other words, the same view that one looks at in an over-the-shoulder look. Then, at the release of the operating switch, the mirror will instantly return to its normal operating position. The adjustment procedure for positioning for the preferred position for normal operation and the setting for the "blind spot" position will be similar to that described above for the exterior mirrors.

If manual operating means was desired for this variation of the basic principle of the invention, a simple extended finger-grasping tab or pushing knob could be affixed to the pivoting mirror sub-assembly, and a simple spring for stored energy return installed. This alternative, of course, would require inboard hand operation. If it was desired to keep all mirrors operating control within range of the operator's outboard hand, the operating system as shown in the preferred embodiment could then be configured for interior rear view mirror operation.

Thus, with the principles of the invention incorporated into the interior mirror location, there could be a second check of the passenger rear view before initiating a passenger-side lane change. Obviously, this would be a "belt and suspenders" approach, but there are some vehicle operators who are so super-sensitive to that particular critical situation, that they endure inordinate stress when it arises. For all other passenger side rear view requirements the passenger side scanning action system described above would be used.

Assemblies 10, 110, and 200 can be made using a variety of readily available low-cost materials, and is producible by mass production techniques. It lends itself to a number of enhancements and changes, none of which violate the spirit of the invention. For example, rotary springs, or other energy storing devices can be used instead of the coil springs shown in many of the Figures. Also, other details of the mechanical design of the second stage aiming of the mirror assembly, which is intrinsic to the system, could be modified. Still another minor enhancement would be to tilt the vertical axis of the pivoting mechanism as the scanning proceeded, if desired. Likewise, other types of actuating means other than the described cable-pulley linkage, can be used, along with energy sources other than human, such as pneumatic, hydraulic, electric (which was used above for the alternate design interior mirror), etc., also without violation of the essential concept of the invention.

Thus, assemblies 10, 110, and 200 provide the vehicle operator with over-riding means to instantly, on demand, at each critical location, convert from the fixed, secured, preferred mirror operating position for normal operating conditions, into an operator controlled panoramic scanning mode, through the full spectrum of the rear-view quadrant, which then automatically, and with certainty, rapidly, almost instantly, returns to the fixed, secured, preferred operating position settings when the demand is removed. It further, if desired, can provide an instant indication of mirror position at one, or more pre-selected positions along the arc of the rear view spectrum in its design range, as the scanning operation proceeds. This allows the operator to pause, dwell, reverse, or continue the scanning sweep, in accordance with his viewing needs at the moment. Assemblies 10, 110, and 200 also obviate the need to take eyes off the road for an over-the-shoulder look, which, in any case, could not be as complete, and in certain instances, not possible. It is capable of modification to suit most classes of automotive vehicles.

Importantly, the assemblies 10, 110, and 200 alleviate some of the stresses typically associated with driving, such as twisting one's neck to view a blind spot. This is a particular benefit to older (e.g., age 50 or higher) or physically-disabled drivers who may have difficulty or may experience pain when moving their necks, especially when entering acute-angle intersections, as the need to move one's neck is reduced, if not completely eliminated, by the present invention. Of course, such a benefit can be appreciated by all drivers, regardless of age.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims.

What is claimed is:

1. A rear view mirror assembly comprising:
   a stationary base portion mounted to a vehicle;
   a mirror housing including a mirror, the mirror pivotable with respect to the mirror housing and the mirror housing pivotable with respect to the stationary base portion;
   a pivoting base assembly in the stationary base portion interconnected with the mirror housing,
      the mirror adjustable with respect to the mirror housing to position the mirror to a proper aiming location in a normal viewing sector for normal vehicle operation, and
      the pivoting base assembly pivotable about an arc to move the mirror housing and the mirror to a viewing position beyond the normal viewing sector;
   a control knob in communication with the pivoting base assembly to pivot the mirror housing and the mirror about an arc beyond the normal viewing sector and to maintain the mirror housing and the mirror in a desired position along the arc; and
   a stored energy device interconnected between the pivoting base assembly and the stationary base portion for automatically returning the mirror housing and the mirror to the proper aiming location.

2. The rear view mirror assembly of claim 1, wherein the stationary base portion further comprises a fixed shaft attached at one end to the stationary base portion and extending through a first aperture in the stationary base portion and a second aperture in the mirror housing.

3. The rear view mirror assembly of claim 2, further comprising a pivot shaft disposed about the fixed shaft and interconnected between the pivoting base assembly and the mirror housing.

4. The rear view mirror assembly of claim 3, further comprising a set screw for interconnecting the mirror housing to the pivot shaft.

5. The rear view mirror assembly of claim 3, further comprising a spring-biased detent screw that coacts with a dimple formed on the pivot shaft for releasably interconnecting the mirror housing to the pivot shaft.

6. The rear view mirror assembly of claim 3, further comprising a thrust bearing ring attached to one end of the pivot shaft for retaining the pivot shaft in axial relationship with the fixed shaft.

7. The rear view mirror assembly of claim 6, further comprising a thrust bearing washer positioned between the thrust bearing ring and the pivot shaft.

8. The rear view mirror assembly of claim 3, further comprising at least one lubricated bushing positioned between the fixed shaft and the pivot shaft.

9. The rear view mirror assembly of claim 3, further comprising a packing gland positioned in the first aperture of the stationary base portion and disposed annularly about the pivot shaft.

10. The rear view mirror assembly of claim 3, wherein the pivoting base assembly further comprising a set screw for engaging the pivot shaft.

11. The rear view mirror assembly of claim 3, further comprising a thrust spring positioned about the pivot shaft for damping vibrations induced by the vehicle.

12. The rear view mirror assembly of claim 1, further comprising a stop surface positioned in the stationary base portion, the stored energy device biasing an end of the pivoting base assembly against the stop surface when the pivoting base assembly is not actuated.

13. The rear view mirror assembly of claim 1, further comprising a cable interconnected between the pivoting base assembly and the control knob.

14. The rear view mirror assembly of claim 13, further comprising one or more direction-changing pulleys in communication with the cable for routing the cable from the pivoting base assembly to the control knob.

15. A rear view mirror assembly comprising:
   a stationary base portion mounted to a vehicle comprising a fixed shaft attached at one end to the stationary base portion and extending through a first aperture in the stationary base portion;
   a mirror housing including a mirror positioned therein, the mirror housing pivotable with respect to the stationary base portion, the mirror housing having a second aperture through which the fixed shaft extends;
   a pivoting base assembly mounted in the stationary base portion and interconnected with the mirror housing;
   a control knob in communication with the pivoting base assembly to pivot the mirror housing about an arc and to maintain the mirror housing in a desired position along the arc;
   a stored energy device interconnected between the pivoting base assembly and the stationary base portion for automatically returning the mirror housing to a normal driving position; and
   a stop surface positioned in the stationary base portion, the stored energy device biasing an end of the pivoting base assembly against the stop surface when the pivoting base assembly is not actuated.

16. The rear view mirror assembly of claim 15, further comprising a pivot shaft disposed about the fixed shaft and interconnected between the pivoting base assembly and the mirror housing.

17. The rear view mirror assembly of claim 16, further comprising a spring-biased detent screw that coacts with a dimple formed on the pivot shaft for releasably interconnecting the mirror housing to the pivot shaft.

18. The rear view mirror assembly of claim 16, further comprising a thrust bearing ring attached to one end of the pivot shaft for retaining the pivot shaft in axial relationship with the fixed shaft.

19. The rear view mirror assembly of claim 18, further comprising a thrust bearing washer positioned between the thrust bearing ring and the pivot shaft.

20. The rear view mirror assembly of claim 16, further comprising at least one lubricated bushing positioned between the fixed shaft and the pivot shaft.

21. The rear view mirror assembly of claim 16, further comprising a packing gland positioned in the first aperture of the stationary base portion and disposed annularly about the pivot shaft.

22. The rear view mirror assembly of claim 16, further comprising a thrust spring positioned about the pivot shaft for damping vibrations induced by the vehicle.

23. The rear view mirror assembly of claim 15, further comprising a cable interconnected between the pivoting base assembly and the control knob.

24. The rear view mirror assembly of claim 23, further comprising one or more direction-changing pulleys in communication with the cable for routing the cable from the pivoting base assembly to the control knob.

* * * * *

UNITED STATES PATENT AND TRADEMARK OFFICE
CERTIFICATE OF CORRECTION

PATENT NO.           : 7,303,295 B1
APPLICATION NO. : 11/233763
DATED                   : December 4, 2007
INVENTOR(S)        : Irving D. Press Page 1 of 1

It is certified that error appears in the above-identified patent and that said Letters Patent is hereby corrected as shown below:

Page 2, col. 2, line 5 in the cited references:

Under Other Publications, the third reference, "Onwer's" should be --Owner's--;

The fourth reference, "Wolrd" should be --World--.

Column 8, line 3, "can not" should be --cannot--.

Signed and Sealed this

Fourth Day of August, 2009

JOHN DOLL
*Acting Director of the United States Patent and Trademark Office*